United States Patent Office 2,729,569
Patented Jan. 3, 1956

2,729,569

DENTAL CEMENTS

Henry Lipkind and Sidney Rogoff, Nutley, N. J.

No Drawing. Application December 12, 1952,
Serial No. 325,688

4 Claims. (Cl. 106—35)

This invention relates to compositions useful in dental restoration practice as cements, fillings, inlays and the like, and particularly to the improvement of such compositions wherein they are beneficiated by incorporating certain compounds known as silicones.

One serious drawback or limitation of conventional aforementioned compositions known to and used in the art of dental restoration has been their lack of resistance to erosive effects of oral fluids with which they are constantly in contact. The dental profession moreover has extended continual efforts not only to the end of increasing the resistance of the conventional cements, fillings and the like to acid and salivary erosion, but to doing so within the scope of esthetic requirements of and acceptance by the subject treated. Such requirements have often been defeated by the tendency to discoloration, or failure to match normal dentition upon continued use, characteristic of the materials used in conventional dental practice.

For purposes of definition, the compositions familiar to those skilled in the art may be classified as:

(1) Dental porcelain type
(2) Chemically autogenous-setting cement type
(3) Synthetic resin type The dental porcelains are thermally fusible and are characterized by excessive shrinkage on cooling. They have normally a highly glazed appearance and, while relatively insoluble in oral fluids are aesthetically objectionable in that they tend to discolor rapidly so that the lines of demarcation between the dental elements of which they are made and the adjacent normal dentition become glaringly apparent. These lines of demarcation moreover become more and more obvious as the margins shrink away.

The second class of compositions listed above are divisible into three subclasses—zinc phosphate cements, copper cements, silicate cements. It is generally recognized by the dental profession that all of these are limited in one respect or another in that none meets all the requirements of an ideal cement, i. e. a cement possessing strength, hardness without brittleness, cohesion, adhesiveness to tooth structure, insolubility in mouth fluids, dimensional stability during and after setting, color stability and retention, and other ancillary properties which broadly relate to the objective of achieving maximum physical identity between natural and artificial dentition, and maintaining such identity over long periods of service. Deviation from or absence of the desirable requirements indicated above make necessary frequent replacement particularly where the patient is a "mouth breather," in which case alternate wetting and drying of the cements rapidly alter their surface appearance.

The third class mentioned namely synthetic resin type, as are for instance illustrated by the currently in vogue acrylic resin replacements are limited because of poor elastic moduli, relatively poor mechanical support which they impart to the surrounding tooth structure and pronounced tendency to shrinkage. These limitations despite their chemical inertness, render them inferior to ceramic (porcelain) and cement types.

Examples of the dental cement compositions of the second class are characterized by the presence, substantially in the proportions shown hereinafter of inorganic phosphates, oxyhalides, oxyphosphates, silicates of heavy metals (zins, silver, copper, etc.). These may be used as such or as supportive elements in the cementation of metal fillings or as adjuncts in ceramic (porcelain) and synthetic resin fillings.

One object of this invention is to provide compositions for dental restoration work that are resistant to erosion by fluids normal to the oral cavity, and resistant to attack by organic acids incident thereto.

Another object of this invention is to provide compositions for dental restoration work which will render elements substantially immune to discoloration and therefore capable of retaining the appearance of the surrounding dentition to the color of which the elements are originally matched. Still another object of this invention is to provide compositions from which restorative elements can be made having superior thermal and mechanical stability.

The means by which the instant inventors propose to achieve these and other related objects, are broadly parallel to and extensive of the means disclosed in their copending application Serial No. 317,827, filed October 30, 1952. Whereas, however, the copending application is limited to dentifrices and compositions useful as dentifrices, the instant invention is specific with respect to materials employed by the dental profession in general restoration work. Essentially, this invention resides in the improvement of dental cements as hereinabove described by inclusion therein of silicones from the groups known as alkylaryl polysiloxanes, alkyl siliconic acids, alkyl silanols and alkyl halosilanes. The alkyl aryl siloxanes are 100% polymerizable and soluble in aliphatic alcohols such as ethyl and isopropyl alcohol. The alkyl group in these compounds may have from 1 to 6 carbon atoms and may also contain one or more silane bonded hydrogens in their configuration. The alkyl siliconic acids, alkyl silanols and alkyl halo silanes are particularly adaptable to the purposes of the invention by virtue of their ability to yield alkali salts, which as will be seen hereinafter are especially suitable for the objects of this invention. In general, these salts may be used in the solid anhydrous state or in aqueous or alcoholic solution. Examples of such salts are sodium methyl siliconate, sodium ethyl siliconate, sodium mono-ethyl chlorosilane, sodium monophenyl chlorosilane, or the sodium salts of mixed alkyl aryl chlorosilanes. All of these salts are characterized by a sodium-silicon ratio of from 2:1 to 1:1.

While the exact mechanism of the physical manner in which the above compounds function in the compositions useful within the scope of this invention is not readily ascertainable, it is generally believed that it is in the nature of the silicone compounds to assume a mono molecular orientation on the solid components of the compositions in such a way that the Si-O linkage forms a surface bond to the solids while the organic groups form a substantially hydrophobic barrier against the aqueous fluids incident to the oral environment and coming in contact with the fillings, inlays, etc. of which the silicones are an integral part.

In general our compositions show good resistance to erosion by fluids normal to the oral cavity when added to dental compositions suitable as fillings and applicable in dental restoration work in amounts as little as .05%. However when the percentage of silicones added is increased over 5% the strength of the composition begins to deteriorate to a point which interferes with its proper use as a dental composition.

In the case of water soluble siliconates, it is further believed that they enter into metathetical reactions with the cations of the metal salt components of the cements to form water insoluble metal siliconates as new and integrally mixed components thereof.

As examples of specific embodiments of the improvements contemplated are the following:

Example I 50 gms. of a silicate cement for fillings (available as, for example, from S. S. White Dental Mfg. Company) was rendered with its liquid (namely solution of phosphoric acid partially neutralized with zinc oxide and alumina) to a consistency suitable for manipulation. The composition of the filling material was, basically, as follows:

| | Parts by wt. |
|---|---|
| Zinc oxide | 9.4 |
| Silica | 36.5 |
| $R_2O_3$ (where R may be aluminum) | 26.3 | previously fused by heating with fluxes to about 2500° F., cooled and finely pulverized. The preparation of the dental cement for use as a filling is very well known in the art and this invention contemplates the preparation of well known dental cements in the usual manner as a preliminary step. One half of the rendered mass was converted to pellet form. To the second half 0.75 gm. of sodium methyl siliconate (or 3% by weight of the solids) was intimately incorporated and the mass also converted to pellet form. All the pellets were allowed to set and harden for 24 hours. It was observed that the addition of the siliconate produced no demonstrable interference with either rate of set, or hardness or color of the pellets.

The pellets were then immersed in 1% hydrochloric acid. The control pellets not containing any sodium methyl siliconate exhibited pronounced discoloration within 1 minute. The pellets containing the siliconate showed no discoloration after 15 minutes immersion.

Example II

The procedure of Example I was carried out with the exception that the "cement" had the following composition:

| | Grams |
|---|---|
| Zinc oxide | 88.0 |
| Silica | .8 |
| Magnesium oxide | 9.4 |
| Bismuth trioxide | 1.8 |

Rendering this composition with orthophosphoric acid to pellet form, as is well known in the art, as in Example I with and without the addition of sodium methyl siliconate, and test immersion, after 24 hours setting and hardening period, in 1% hydrochloric acid yielded the following observation:

(a) Discoloration of pellets without the siliconate: pronounced after 1 minute (b) Discoloration of pellets with the addition of the siliconate; none after 15 min.

Example III 60 gm. of zinc oxide was rendered to a paste with orthophosphoric acid in the ratio of 3 parts of ZnO by weight to 1 part of commercial $H_3PO_4$ solution of 50% concentration in water. The paste was manipulated to the form of short rods about 1 cm. long and the rods allowed to harden. Into a second batch of paste as above sodium methyl siliconate was incorporated in the proportion of 2% by weight of the zinc oxide and the batch molded to rod form.

Immersion tests in 1% hydrochloric acid was followed by these observations:

| | After 2 Mins. | After 40 Mins. |
|---|---|---|
| Siliconate containing Rods | No visible effect | Roughening and Discoloration barely visible. |
| Rods Without Siliconate | Roughening and Discoloration visible. | Radical Deterioration. |

It is to be understood that the above examples are merely illustrative of the improvements obtained. The compositions of the cements shown and the procedures of obtaining the cements as practiced by the dental profession and by manufacturers of the cements vary over an enormous range both quantitatively and qualitatively. It is within the scope of this invention to apply the valuable findings as to the improvements inherent in the use of the silicones and siliconates, in the dental practices of the art, not only to the beneficiation and improvement of the cements themselves but also to placement and use of these cements in dental cavities and replacements. To illustrate:

Example IV

In the case of one patient whose past history exhibited an extreme intolerance to silicate cements and other signs of a very acid mouth, the restoration work was accomplished as follows: Two cavities were filled in the usual manner using the cement as per Example I. Two other cavities were primed after usual prior sterilization with a 5% solution of sodium methyl siliconate in ethyl alcohol. After the primed surfaces were permitted to dry, the cavities were filled with cement as per Example I but containing sodium methyl siliconate as shown. The cavities were examined after three months. The first two cavities exhibited loss of polish and finish. The siliconate improved fillings exhibited no such change indicating a greater durability of the filling before further replacement would be necessary.

In setting forth their claims the inventors wish it to be clearly understood that their invention is to be construed as broadly inclusive of all possible changes that may be made in its practice without departing from its spirit or scope; the form herein described being a preferred embodiment for illustrative purposes.

We claim:

1. The improvement in the class of dental compositions suitable as fillings and applicable in dental restoration work, which comprises integrally incorporating into said compositions from 0.05% to 5.0% by weight of a water soluble alkali metal salt of an alkyl siliconic acid in which the alkyl group is characterized by having from 1 to 6 carbon atoms and in which the ratio of alkali metal to silicon is from 2:1 to 1:1.

2. The improvement in the class of dental compositions suitable as fillings and applicable in dental restoration work, which comprises integrally incorporating into said compositions from 0.05% to 5.0% by weight of a water soluble alkali metal salt of a methyl siliconic acid in which the ratio of alkali metal to silicon is from 2:1 to 1:1.

3. The improvement in the class of dental compositions suitable as fillings and applicable in dental restoration work, which comprises integrally incorporating into said compositions from 0.05% to 5.0% by weight of sodium methyl siliconate.

4. The improvement in the class of dental compositions suitable as fillings and applicable in dental restoration work, which comprises integrally incorporating into said compositions substantially 2% by weight of sodium methyl siliconate.

References Cited in the file of this patent

UNITED STATES PATENTS

| | | |
|---|---|---|
| Re. 21,779 | Schlesinger | Apr. 22, 1941 |
| 1,450,467 | Weyland | Apr. 3, 1923 |

OTHER REFERENCES

Rochow: "Chemistry of the Silicons," 2nd ed., 1951, page 54.